US005315664A

United States Patent [19]
Kumagai

[11] Patent Number: 5,315,664
[45] Date of Patent: May 24, 1994

[54] NUMBER PLATE RECOGNITION SYSTEM

[75] Inventor: Ryohei Kumagai, Tokyo, Japan

[73] Assignee: Ezel, Inc., Tokyo, Japan

[21] Appl. No.: 67,166

[22] Filed: May 26, 1993

Related U.S. Application Data

[63] Continuation of Ser. No. 620,008, Nov. 30, 1990, abandoned.

[30] Foreign Application Priority Data

Dec. 2, 1989 [JP] Japan ................. 1-313910

[51] Int. Cl.$^5$ .............................. G06K 9/00
[52] U.S. Cl. .......................... 382/1; 382/9; 382/48
[58] Field of Search ............ 382/1, 30, 9, 48, 50, 382/54, 25, 51, 52, 53, 27

[56] References Cited

U.S. PATENT DOCUMENTS

| | | | |
|---|---|---|---|
| 3,905,018 | 9/1975 | Gray ........................ | 382/34 |
| 4,000,399 | 12/1976 | Kawahara ................. | 382/54 |
| 4,115,803 | 9/1978 | Morton ..................... | 382/25 |
| 4,567,609 | 1/1986 | Metcalf ..................... | 382/9 |
| 4,817,166 | 3/1989 | Gonzalez et al. ......... | 382/1 |
| 4,823,194 | 4/1989 | Mishima et al. .......... | 382/54 |
| 4,878,248 | 10/1989 | Shyu et al. ................ | 382/9 |

FOREIGN PATENT DOCUMENTS 8707057 11/1987 World Int. Prop. O. .

OTHER PUBLICATIONS

Stephen B. Gray, Local Properties of Binary Images in Two Dimensions, vol. C-20, No. 5, May 1971.

Iida et al., "Development of the High Speed Image Processing System and Its Application", Mitsubishi Jukogyo Giho, vol. 27, No. 1, pp. 76-80, 1990.

*Primary Examiner*—Joseph Mancuso
*Attorney, Agent, or Firm*—Cushman, Darby & Cushman

[57] ABSTRACT

A number plate recognition system has structure for inputting an image; structure for calculating outlines of each configuration included in an input image, as well as for recognizing a configuration with the maximal outline size as the plate area. The areas in an image except the above plate area are masked, and the numbers are determined by using Euler numbers after calculating Euler numbers for each configuration within the above plate area.

5 Claims, 4 Drawing Sheets

FIG. 3

| NUMBER | NUMBER OF CONCAVITIES | CONCAVITY AREA | EULER NUMBER | NUMBER OF END POINTS |
|---|---|---|---|---|
| 0 | 0 | — | 0 | 0 |
| 1 | 0 | — | 1 | 2 |
| 2 | 2 | a%, b% | 1 | 2 |
| 3 | 3 | c%, d%, e% | 1 | 2 |
| 4 | 4 | f%, g%, h%, i% | 1 | 3 |
| 5 | 3 | j%, k%, l% | 0 | 3 |
| 6 | 1 | m% | 1 | 1 |
| 7 | 1 | n% | | 2 |
| 8 | 2 | p%, q% | -1 | 0 |
| 9 | 1 | r% | 0 | 1 |

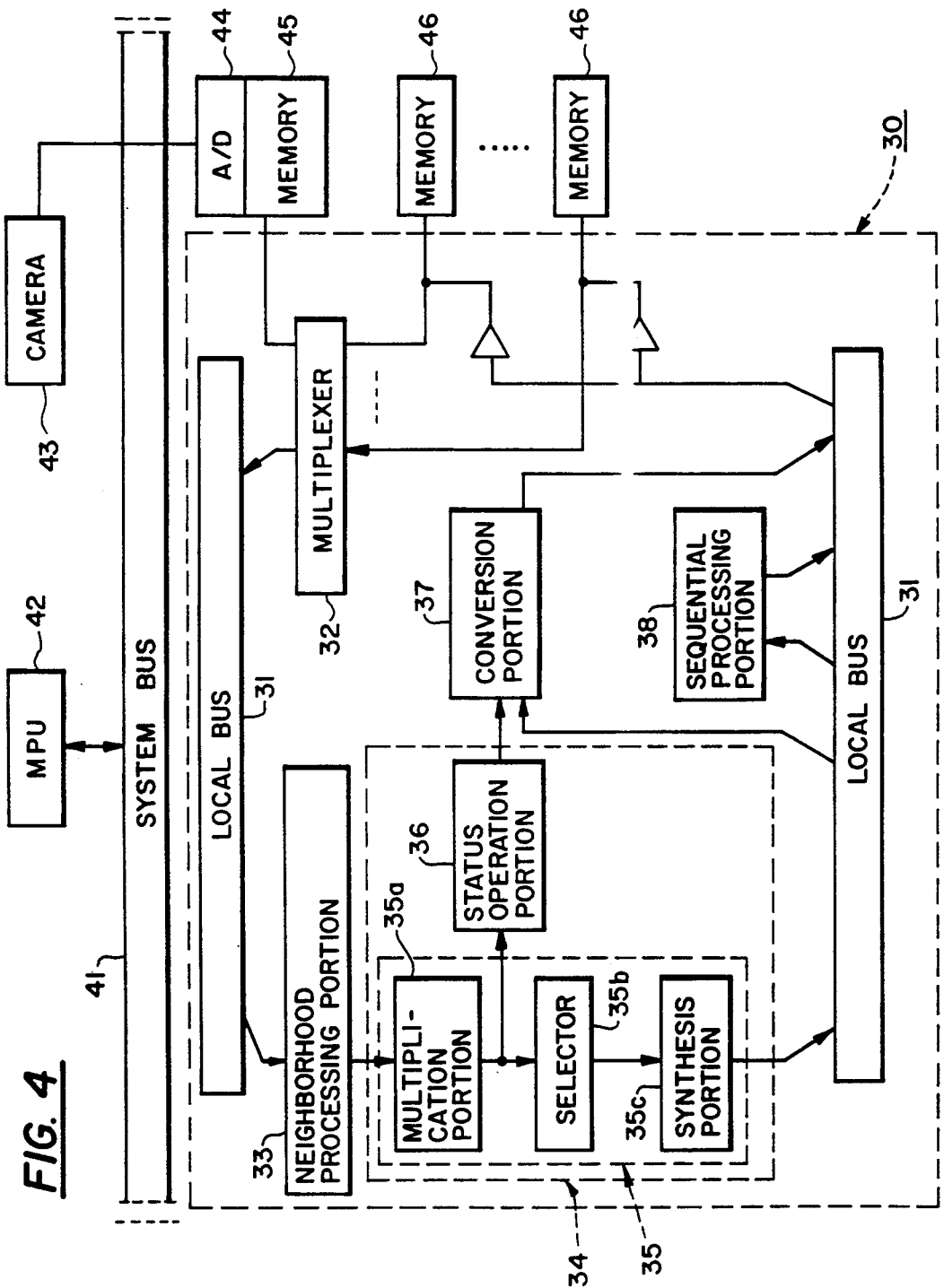

NUMBER PLATE RECOGNITION SYSTEM

This is a continuation of application Ser. No. 07/620,008, filed on Nov. 30, 1990, which was abandoned upon the filling hereof.

FIELD OF INVENTION

The present invention relates to a number plate recognition system for recognizing the numbers, etc., on the number plate of a running car.

PRIOR ARTS

A system is known for judging the condition of a traffic jam by tracking the numbers on the number plates of the running cars by using 2 video cameras. According to the above system, speeds of cars, i.e. the condition of the traffic, are measured with respect to the numbers on input number plates from each camera by setting 2 video cameras along a highway at a predetermined altitude so as to photograph the numbers on the number plates.

SUMMARY OF THE INVENTION

Since the altitudes of set cameras are fixed, it can only operate on cars with number plates set at the normal height. Also the above conventional system does not recognize the numbers themselves displayed on the number plates. Finally, it is impossible to recognize this number plates of running cars by the system.

The present invention has an object to provide a system that can recognize the displayed contents on the number plates of running cars independent of the heights of set number plates.

A number plate recognition system according to the present invention comprises:

a means for inputting an image;

a means for calculating fillet diameters of each configuration included in an input image, as well as, for recognizing a configuration with the maximal fillet diameter as plate area;

a means for masking the areas in an image except the above plate area;

a means for judging the numbers by using Euler numbers after calculating Euler numbers for each configuration within the above plate area.

DESCRIPTION OF THE DRAWINGS

FIG. 3 shows a table showing number of concavities, concavity area, Euler number and number of end points for each number;

FIG. 4 shows a circuit diagram indicating the main structures of a computer for the performance of the present invention.

PREFERRED EMBODIMENT OF THE PRESENT INVENTION

Hereinafter, the present invention is described with respect to embodiments referring to the attached drawings.

Figure 1:
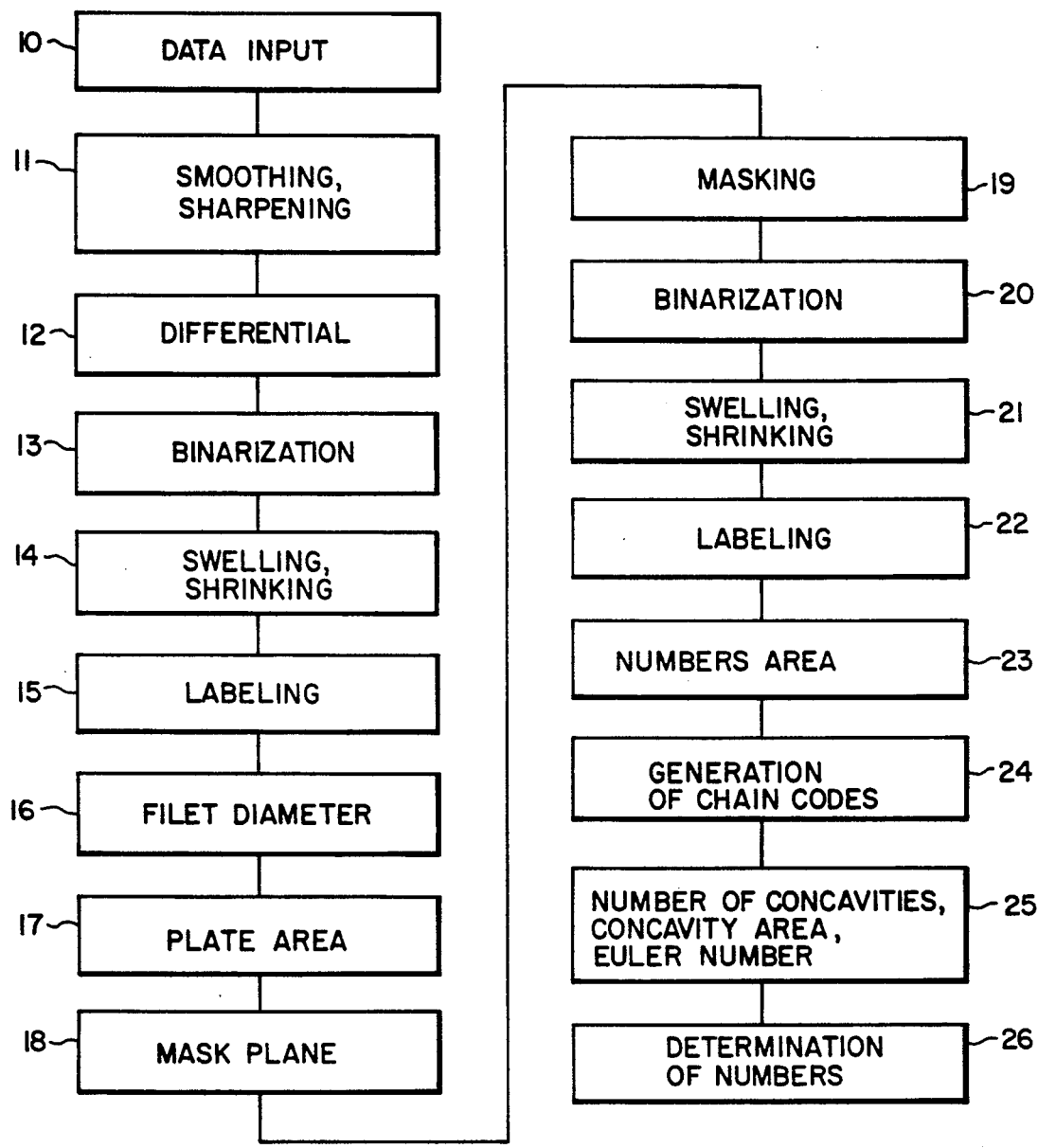
FIG. 1 shows a flow chart of an embodiment according to the present invention.
Figure 2A:
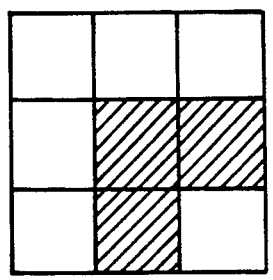
FIGS. 2a-d show the diagrams showing of the arrangement with respect to T, F, D and E for the calculation of Euler number.
Figure 2B:
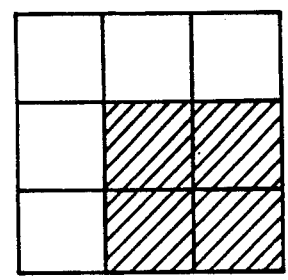
Figure 2C:
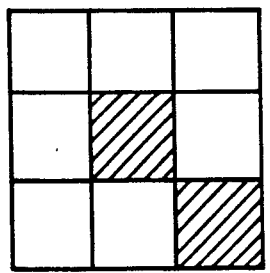
Figure 2D:
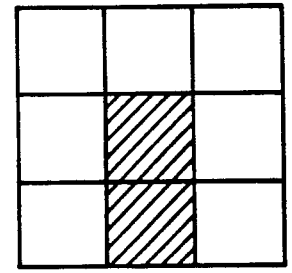

According to the present embodiment, number plate information of input car from video camera is processed by a computer so as to recognize the displayed numbers of the plate. FIG. 1 shows the sequence of operations of a recognition system for numbers on a number plate, according to an embodiment of the present invention.

A video camera, which is not shown in the figure, takes a photograph of a body of a running car on which a number plate is attached. At step 10, the above image data is input to the above system at the status of a digital data. At step 11, smoothing and sharpening are performed so as to clarify an input digital image. Here, the higher performance of noise reduction and edge sharpening can be obtained by a Median filter, as compared with a combination of smoothing and sharpening.

At step 12, differentials in both vertical and horizontal directions are performed with respect to each pixel included in an image. The sum of the above differential values in both vertical and horizontal directions is calculated. The horizontal lines of an image is distinguished from the differential in the vertical direction and vertical lines of an image is distinguished by the differential in the horizontal direction. Accordingly, outlines of a number plate and vertical and horizontal lines of the numbers are clarified.

The image obtained as above is binarized at step 13 in accordance with the optimal threshold calculated by a discriminating analysis method. According to the discriminating analysis method, first, variances (variance within a class) with respect to the densities of the pixels for each group are calculated after dividing pixels into 2 groups according to their densities. Second, variance defined for total pixels (variance between classes) is calculated by using density distribution of all pixels. Then a threshold is selected so that the ratio between variance within a class and variance between classes, i.e. the variance ratio, becomes maximal so as to binarize all pixels in an image by using the above threshold. As step 14, swelling and shrinking are performed for the image so as to modify the roughness on the outlines of each configuration. From the experience, an effective result can be obtained by repeating the above swelling and shrinking 3 times. Here, configurations according to the present embodiment mean outlines, numbers and characters of a number plate.

At step 15, labeling is performed for the image. The continuous configurations within the image are classified into groups and different numbers are given to each configuration from others. Here, the above numbers are given with densities so that different densities are given to each configuration from others by this labeling.

At step 16, sizes or outlines of images bounded by the labelling, these sizes called herein fillet diameters, for each configuration are calculated. At step 17, a configuration with the maximal fillet diameter is recognized as a plate area, i.e., an outline of a number plate.

Data with respect to the areas except the plate area is unnecessary for the number plate recognition according to the present embodiment. Accordingly, the mask plane is generated at step 18 for the prevention of pixel data except in a plate area being used at later steps. The above mask plane is a memory prepared in an image processing system. Densities of "1", for example, are input to number plate area and "0" densities are input to the areas except the number plate area using this mask plane. At step 19, transmission of pixel data with respect to the contents of above memory, i.e. masking processing, is performed by a computer so that configuration data only at a plate area is input to the operation portion, etc., in a computer.

At step 20, binarization is performed with respect to only pixel data within the plate area obtained by masking processing at step 18. Swelling and shrinking are performed onto the above binarized pixel data at step 21 so as to modify the roughness on the outlines of each configuration. At step 22, labeling is performed so as to classify the configurations into groups, and to add different numbers to each configuration. The numbers are given by the densities, as it is described at step 15, so that different densities are given to each configuration by this labeling.

At step 23, fillet diameters for each configuration are calculated. Accordingly, the judgment whether the configurations are the number or not is performed and numbers area is extracted.

The configurations within the numbers area, i.e. the numerical configurations, are converted into chain codes at step 24. At step 25, number of concavities and concavity area are calculated for each configuration according to the chain codes. Number of concavities is the number of concavity parts on the a periphery of a configuration. Concavity area is an area at concavity part. At step 25, Euler numbers and number of end points for each configuration are calculated as well. Euler number is calculated by adding number of elements T, F, D and E included in a configuration. Hereinafter, elements T, F, D and E are described with reference to a 3×3 convolution. As shown in FIG. 2 (a), (b), (c) and (d), T is 3 pixels' L-shaped pattern, F is a 4 pixels' pattern forming of a rectangle, D is a 2 pixels' pattern arranged diagonally and E is a 2 pixels' pattern arranged vertically or horizontally. On the other hand, number of end points is the number of end parts of a configuration. For example, there are 2 end points in a character "2".

FIG. 3 shows number of concavities, concavity area, Euler number and number of end points for each number from "0" to "9". Concavity area is calculated by measuring the characters on a number plate, practically. Here, the concrete numbers are not indicated.

Accordingly, numbers are specified from number of concavities, concavity area, Euler number and number of end points. At step 26, the numbers read from the above information are recognized. Various algorithms are applicable for the step 26; for example, a number may be specified by using concavity area, Euler number, a number of end points, after determining the sorts of number by number of concavities.

According to the characters, signs, etc., on the number plate, they are ignored with respect to the present system, since they have the different characteristics, such as a fillet diameter, as compared with the numbers. However, the recognition of, for example, characters is possible by setting up fillet diameter, number of concavities, number of end points, etc., beforehand as it is done for the recognition of the numbers.

According to the above, the present embodiment is comprised to photograph a comparatively wide area including a number plate of a car as well as to recognize the numbers by using fillet diameter, etc., after extracting only a number plate area. Therefore, it is possible to recognize the numbers of a running car irrelevant of the location of the set number plate.

FIG. 4 shows the structure of a configuration processing portion 30 according to the present embodiment. Configuration processing portion 30 performs the recognition of a number plate under the control of micro processing unit (MPU) 42 to which configuration processing portion 30 is connected through system bus 41 and local bus 31. The images photographed by a video camera 43 are A/D converted at A/D converter system 44, then are input to configuration processing portion 30 as data for an image after being accumulated at memory 45. This memory 45 is connected to multiplexer 32 of configuration processing portion 30. Configuration processing portion 30 transmits data selectively input from frame memory 46 through multiplexer 32 to neighborhood processing portion 33 through local bus 31. Neighborhood processing portion 33 holds data by the predetermined neighborhood area unit (for example, 3×3) and inputs the above data to operation portion 34 in parallel. Operation portion 34 comprises numerical operation portion 35 and status operation portion 36. Outputs of neighborhood processing portion 33 are input to numerical operation portion 35. Numerical operation portion 35 is comprised by connecting multiplication portion 35a, selector 35b and synthesis portion 35c, successively, and performs numerical operations; such as median filtering, differential, swelling, shrinking, etc. Multiplication portion 35a is arranged at the first stage according to the inventors' concept that the different multipliers of absolute value are never multiplied to identical pixels, where numerical operation performs, for example, the numerical unification processing after multiplying densities of each pixel. Accordingly, Kernel numbers at multiplication portion are deemed to be the minimal value equal to the number of pixels to be processed simultaneously, and number of gates at rearer selector 35b and synthesis portion 35c decrease. Therefore, numerical operation portion 35 is possible to have the maximal function within a small-scale circuit and a high speed processing. Steps 11, 12, 14 and 21 are performed at numerical operation portion 35. Data in numerical operation portion 35 are led to status operation portion 36. Following judgments or operations are performed at status operation portion 36 with respect to the pixels in the predetermined neighborhood area:

i) whether a center pixel is an objective pixel to be processed or not;

ii) whether pixels with different densities from that of a center pixel exist in 8-neighborhood or not;

iii) whether pixels in 8-neighborhood are equivalent to a center pixel or not;

iv) numbers of T, F, D and E for the calculation of Euler number;

v) identification ratio with sample pattern;

vi) others.

Contemplation for increasing the efficiency and heightening the speed of each circuit becomes possible by performing both numerical operation and status operation in parallel at the different circuits. Furthermore, outputs of status operation portion 36 themselves are the effective characteristics values or the effective data for the extraction of characteristics values. Outputs of status operation portion 36 are input to conversion portion 37, and characteristics values are calculated by the processings of characteristics extraction, multiplication, comparison, etc. Element calculation of Euler numbers for the above step 25 is performed at status operation portion 36.

Conversion portion 37 is comprised by feeding back the outputs of light computation portion to data input of a high speed memory by connecting light computation portion, such as a full adder, to a branch of output of a high speed memory, such as a static RAM. According to the above structure, it is possible to perform the complex operations within a small-scale circuit at a high speed: for example, the performance of the same operation onto the same data, repeatedly; multiplication of data; sequential comparison of data; etc. Binarization after the calculation of thresholds (step 20), multiplication of Euler number element (step 25) and extraction of fillet coordinates are performed at this conversion portion 37.

Outputs of operation portion 34 and conversion portion 37 are returned to one of frame memory 46 through output side of local bus 31. Sequential processing portion 38, in which sequential processing, such as labeling, are performed, is connected to output side local bus. Sequential processing portion 38, comprising line memory, latch, and logical portion, performs sequential processing with referring to processed density at one raster before an objective pixels to be processed. Above step 15 and 22 are performed at this sequential processing portion 38.

According to such processing portion 30, it is possible to calculate various characteristics values at a high speed. Therefore, MPU 42 recognizes numbers on a number plate of a running car, promptly by performing binarization through discriminating analysis method, calculation of fillet diameter, recognition of plate are, drawing of a mask plane, generation of chain codes, calculation of number of concavities and concavity area, etc., according to the above characteristics value. Furthermore, it is possible to read and write data at extremely high speed by applying dual port memory for frame memory 46.

According to the present invention as mentioned above, it is possible to obtain advantages that the recognition of displayed contents on a number plate of a running car is possible irrelevant to the height of a set number plate.

What is claimed is:

1. A number plate recognition system comprising:
   a video camera which obtains an image which includes a number plate to be recognized;
   processing means, receiving said image, for:
   1) determining an outline of the number plate in both the vertical and the horizontal directions;
   2) labeling portions of the image to determine continuous configurations within the image, each continuous configuration within the image being classified as a group having a different labelling number,
   3) determining sizes of the image portions bounded by the labeling to determine a configuration,
   4) setting one of the configurations having a maximal diameter which is a largest size diameter, based on said sizes, as a diameter of the number plate,
   5) determining variances for each said pixel within said groups;
   6) dividing the pixels into subgroups according to their densities;
   7) calculating a threshold whereby a ratio between variance within a group and variance between groups is maximum; and
   8) using said threshold to binarize said pixels; and
   means for calculating values within an area defined by said maximal diameter from which numbers on said number plate can be calculated.

2. A system as in claim 1, wherein said grouping is made by densities.

3. A number plate recognition system as in claim 1 wherein said processing means is also for calculating differentials for said plurality of pixels in said vertical and horizontal directions and using values of said differentials to determine an outline of the number plate in both the vertical and the horizontal directions.

4. A method of recognizing a number plate recognition system comprising;
   means for obtaining an image which includes a number plate to be recognized;
   processing means receiving said image, for:
   1) determining densities of portions of the image and labelling said densities, to determine continuous configurations within the image, each continuous configuration within the image being classified as a group having a different labelling number,
   2) determining sizes of the image portions bounded by the labeling to determine a configuration,
   3) setting one of the configurations having a maximal diameter which is a largest diameter found, based on said sizes, as a diameter of the number plate;
   4) determining variances for each pixel within said groups;
   6) dividing the pixels into two subgroups according to their densities;
   7) calculating a threshold whereby a ratio between variance within a group and variance between groups is maximum; and
   8) using said threshold to binarize said pixels; and
   means for calculating values within an area defined by said maximal diameter from which numbers on said number plate can be calculated.

5. A number plate recognition system as in claim 4 wherein said processing means is also for calculating differentials for said plurality of pixels in said vertical and horizontal directions and using values of said differentials to determine an outline of the number plate in both the vertical and the horizontal directions.

* * * * *